(12) United States Patent
Holzhüter (10) Patent No.: US 11,892,569 B2
(45) Date of Patent: Feb. 6, 2024

(54) METHOD AND DEVICE FOR OPTICAL DISTANCE MEASUREMENT

(71) Applicant: Microvision, Inc., Redmond, WA (US)

(72) Inventor: Hanno Holzhüter, Hamburg (DE)

(73) Assignee: Microvision, Inc., Redmond, WA (US)

( * ) Notice: Subject to any disclaimer, the term of this patent is extended or adjusted under 35 U.S.C. 154(b) by 879 days.

(21) Appl. No.: 16/815,331

(22) Filed: Mar. 11, 2020

(65) Prior Publication Data

US 2020/0309922 A1 Oct. 1, 2020

(30) Foreign Application Priority Data

Mar. 27, 2019 (EP) ..................................... 19165546

(51) Int. Cl.
*G01S 7/4865* (2020.01)
*G01S 17/931* (2020.01)
*G01S 17/10* (2020.01)

(52) U.S. Cl.
CPC ............ *G01S 7/4866* (2013.01); *G01S 17/10* (2013.01); *G01S 17/931* (2020.01)

(58) Field of Classification Search
CPC ............................... G01S 7/4866; G01S 17/10
See application file for complete search history.

(56) References Cited

U.S. PATENT DOCUMENTS

| 2007/0171396 A1* | 7/2007 | Harris ..................... G01S 7/493 356/28 |
| 2014/0324266 A1 | 10/2014 | Zhu et al. |
| 2016/0014395 A1* | 1/2016 | Murray ................... G01S 17/86 348/42 |
| 2021/0072395 A1* | 3/2021 | Yoshizawa ............... G01C 3/06 |

FOREIGN PATENT DOCUMENTS

| DE | 102012112987 B3 | 5/2013 |
| DE | 102012112987 B3 * | 12/2013 ............. G01S 17/42 |

OTHER PUBLICATIONS

European search report issued by the European Patent Office for corresponding European Patent Application No. EP19165546, dated Oct. 1, 2019, with full English translation attached.

* cited by examiner

*Primary Examiner* — Isam A Alsomiri
*Assistant Examiner* — Sanjida Naser
(74) *Attorney, Agent, or Firm* — Kevin D. Wills (57) ABSTRACT

A method for optical distance measurement is suggested which comprises executing at least one time-of-flight measurement, wherein a time-of-flight measurement comprises transmitting at least one measuring pulse by means of a transmission unit, reflecting at least one transmitted measuring pulse and receiving at least one reflected measuring pulse by means of a reception unit. The method further comprises generating a backscatter curve based on the time-of-flight measurement and evaluating the backscatter curve for object recognition.

19 Claims, 5 Drawing Sheets

METHOD AND DEVICE FOR OPTICAL DISTANCE MEASUREMENT

CROSS REFERENCE TO RELATED APPLICATIONS

This application takes priority from European Application No. 19165546.3, filed Mar. 27, 2019, the contents of which are incorporated by reference herein.

TECHNICAL FIELD

The present invention relates to a method as well as an apparatus for optical distance measurements.

BACKGROUND

Lidar (an acronym for "light detection and ranging") sensors are generally known. The Lidar sensors comprise a transmission unit for transmitting measuring pulses as well as a reception unit for receiving reflected measuring pulses, which are reflected by objects within the measuring range of the sensor. Based on the time of flight principle, the speed of light is used to infer the distance to the objects that reflected the measuring pulses.

Obtained as a result of such time-of-flight measurements is a point cloud, in which each point represents a single measurement, i.e., the reception of a transmitted and reflected measuring pulse. Overall, the quality of such a point cloud suffers under difficult weather conditions, for example fog, dust, spray, etc. This is because the reflections on the particles and their accompanying points in the LIDAR point cloud are erroneously recognized as object reflections. Depending on the particle density, this can end up resulting in the complete failure of the device.

However, a major disadvantage of generally available distance measurement devices is that they are unable to recognize that they are located in a particle cloud. For example, the device erroneously recognizes a particle as an object. This diminishes the quality of the time-of-flight measurement as the result of a time-of-flight measurement that has been degraded by a particle cloud is treated with the same certainty, i.e., with an equally high confidence level, as a measurement under conditions without a particle cloud. It is only possible to estimate the quality of the produced point cloud as a result of the time-of-flight measurement in subsequent computing units, which evaluate the delivered data over several time intervals.

SUMMARY

An objective of the present invention is to improve a method and a device for optical distance measurement in such a way that the reflection of measuring pulses on a particle cloud can be distinguished from a reflection on an object.

This objective is solved by a method for optical distance measurement that comprises executing at least one time-of-flight measurement. A time-of-flight measurement comprises transmitting at least one measuring pulse, in particular precisely one or a plurality of measuring pulses, by means of a transmission unit, as well as reflecting at least one transmitted measuring pulse, in particular transmitted measuring pulses, preferably on a particle cloud or on at least one object, and receiving at least one measuring pulse, in particular reflected measuring pulses, by means of a reception unit. Further, the method comprises generating a point cloud based on the time-of-flight measurement. The point cloud is a result of the time-of-flight measurement.

The method can further preferably comprise determining the time-of-flight of each transmitted, reflected and received measuring pulse. In particular, the method also comprises generating a histogram, in which the received optical power (or a corresponding electronic signal based on the measured optical power) versus the determined time-of-flight is recorded. The determined time-of-flight for several measuring pulses can further be averaged. A histogram with the averaged values can then be generated as well.

In particular, each reflected measuring pulse received by means of the reception unit yields a point in a point cloud, preferably in a 2D or 3D local coordinate system. Therefore, at least one point in a point cloud is obtained as a result of a time-of-flight measurement. In addition, the determined time-of-flight of several receiving and reflected measuring pulses can be averaged, so that the latter together represent a point in a point cloud.

Further, the method comprises generating a backscatter curve based on the time-of-flight measurement, wherein the method comprises evaluating the backscatter curve for the object recognition of at least one object and/or at least one particle cloud on which at least one measuring pulse was reflected. The method comprises providing a sensitivity curve for evaluating the backscatter curve, wherein evaluating the backscatter curve comprises determining a correlation between the sensitivity curve and the backscatter curve so as to use the at least one time-of-flight measurement to determine whether a particle cloud is arranged in a measuring range measured by means of the at least one time-of-flight measurement, and to allocate a particle cloud feature to the time-of-flight measurement. In particular, the term "measured measuring range" is to be understood as the area passed by the measuring pulse of the time-of-flight measurement.

The correlation is ascertained in order to determine whether a particle cloud is located in a measuring range measured by means of the at least one time-of-flight measurement. In other words, it is determined whether a device for implementing the method is located in and/or in front of a particle cloud. The method advantageously comprises using the at least one time-of-flight measurement to determine whether a particle cloud is arranged in the measuring range, and to allocate a particle cloud feature to the time-of-flight measurement.

In particular, the term "particle cloud feature" is to be understood as a particle cloud status and/or a particle cloud probability. In particular, the particle cloud feature is ascertained based on the determined correlation. A particle cloud status could indicate whether the correlation suggests that a particle cloud is located in a measuring range or not. The status could thus be present as dual yes/no information. For example, the status could be "yes" if the correlation exceeds a pre-set threshold, and "no" if it lies thereunder.

In addition, a particle cloud probability can be determined. It could be understood as a level of confidence of the fact that measuring pulses were reflected on a particle cloud. As a consequence, the method can determine a confidence level between 0 and 100%, wherein 100% means that the correlation is very high, so that it is assumed that measuring pulses were reflected on a particle cloud, while 0% means that the correlation is negligibly slight, so that it is assumed that no measuring pulse was reflected on a particle cloud. In particular, the confidence level is ascertained based on the determined correlation.

Accordingly, the correlation may be determined so as not to erroneously recognize a particle cloud as an object.

The term "optical distance measurement" is to be understood that optical signals, here optical measuring pulses, are used to determine distances. The term "distance" is to be understood as a distance. The distance covered by the measuring pulse is to be understood as the route between the transmission unit that transmitted the measuring pulse and the reflection object that reflected it, plus the route between the reflection object and the reception unit that received the corresponding reflected measuring pulse. The reflected measuring pulses each represent backscatter signals of the transmitted measuring pulses. The term "reflection object" can be understood as an object and/or a particle cloud.

In particular, the method is used in the driverless navigation of vehicles, in particular automobiles. The method can be used for autonomously controlling a vehicle. In addition, the method can assist the driver of a vehicle. For this purpose, in particular the distances to all reflection objects lying in a measuring range are determined.

Further, a measuring pulse is an optical, in particular electromagnetic, signal. The measuring pulse is advantageously a light pulse, i.e., a pulse with a wavelength that does not stem from the range visible to the human eye. For safety reasons, invisible infrared is preferably used. A measuring pulse preferably has a pulse width, so that the measuring pulse can be understood as a time-limited portion of electromagnetic radiation. Since the measuring pulse comprises an electromagnetic signal, and the speed of the measuring pulse is known, it can be inferred from the time-of-flight of a measuring pulse using the speed of light, which route the measuring pulse has covered within the time-of-flight.

Preferably, the reception unit can comprise at least one detector, for example a photodetector, especially an optical detector. The reception unit can comprise a plurality of reception elements, which preferably operate in the linear or Geiger mode. Reception elements that operate in the linear mode can comprise especially avalanche photodiodes, PN photodiodes, PIN diodes or photomultipliers, while the reception elements that operate in the Geiger mode preferably comprise single photon avalanche diodes (SPADs). In the latter, each photon is individually measured, and averaging takes place via the obtained histogram. Particularly, time correlated single photon counting is used. The term "reception element" comprises in particular pixels. When using reception elements in the Geiger mode, no a/d converter is preferably used. This reduces the costs of the process.

In addition, the transmission unit can comprise a plurality of transmission elements, which in particular are respectively formed by a laser. In particular, the transmission unit is to be understood as a "transmission matrix", i.e., as an array of transmission elements, while the reception unit is to be understood as a reception matrix, i.e., as an array of reception elements. In particular, a matrix can be understood as a three-dimensional, in particular plate-shaped, body, on a surface of which the corresponding elements, transmission elements or reception elements, are arranged.

In particular, the term "particle cloud" comprises an accumulation of particles in the air. In particular, a particle cloud comprises an aerosol. Advantageously, it is finely dispersed solid and/or liquid particles suspended in the air. For example, it can be finely dispersed liquid drops in the air, for example fog or spray. It can also be finely dispersed solid dust particles, for example dust or smog. In addition, a particle cloud can be understood as an exhaust cloud from the exhaust pipe of a vehicle, which in particular consists of oil and soot fumes. The dimension, in particular the diameter, of the particle is typically less than 1 mm, in particular less than 100 μm, most preferably less than 50 μm.

By comparison to a particle cloud, an object is not an aerosol within the meaning of the invention. Primarily a solid or liquid body is involved.

Further, the term "backscatter curve" refers to a curve which can be used to infer the optical power received by the reception unit relating to the determined time-of-flight. In particular, the backscatter curve is the generated histogram of a time-of-flight measurement. The received optical power is here preferably converted into an electronic signal, which is recorded in relation to the determined time-of-flight. In order to generate the backscatter curve, a corresponding electronic signal along with the time-of-flight of at least one transmitted and again received measuring pulse are preferably determined based on the measured optical power, wherein the at least one corresponding value pair is recorded on a coordinate system with the electronic signal as the y-axis and the time-of-flight as the x-axis.

In other words, the backscatter curve comprises the raw signal of the time-of-flight measurement. Understood as the raw signal is the analog or digital representation of the reflected optical signal, in other words the electronic signal into which the received reflected optical power is converted. The backscatter curve is a result of all transmitted, reflected and again received measuring pulses of the same time-of-flight measurement.

Advantageously, when using reception elements that operate in the linear mode, a time-of-flight measurement comprises in particular the transmitting of precisely one measuring pulse. Time-of-flight information of a plurality of photons is already considered during the reception of the individually transmitted and reflected measuring pulse, so that the generated histogram of an individual measuring pulse represents the backscatter curve. This stems from the fact that individual photons are reflected on closer particles of the particle cloud, while other photons are reflected on more remote particles.

By contrast, when using reception elements in the Geiger mode, the time-of-flight measurement comprises the transmitting of a plurality of measuring pulses, wherein the histogram displays the averaged times-of-flight. The histogram can represent the backscatter curve.

In particular, the term "sensitivity curve" of the reception unit refers to the sensitivity curve of the reception unit, in particular of a device for implementing the method. Among other things, the sensitivity curve describes how sensitive the reception unit or individual reception elements of the reception unit respond to how much distance there is between a reflection object and the reception unit. In other words, the sensitivity curve describes the influence exerted by the distance of the reflection object, on which a measuring pulse is reflected, on the optical power that is detected assuming an identical optical power of the measuring pulse.

In addition, other factors can have an influence on the sensitivity curve, e.g., what divergences a transmission and reception unit of a device have, and/or how far the transmission and reception units are located from each other. Essential influencing factors on the sensitivity curve further include the optical and mechanical design of the reception unit and/or the transmission unit, as well as the applied electronic components, for example the reception elements and/or the transmission elements, in particular diodes, and/or also amplifiers. The sensitivity curve is thus reception-unit-specific, in particular device-specific or sensor-specific.

As a whole, the sensitivity curve represents an elevation, in other words a "peak", in a coordinate system with the electronic signal into which the optical power was converted on the y-axis, and the time-of-flight on the x-axis, preferably with a rising edge and a falling edge.

The shape of the sensitivity curve arises from the fact that less optical power of the backscatter signal is naturally expected as distance increases. However, the maximum power is only reached starting at a specific distance to the reception unit due to the influence factors mentioned above.

Further, the method can comprise providing a single shared sensitivity curve for the entire reception unit and/or the entire device. In addition, the method can comprise providing a sensitivity curve for each reception element of the reception unit. The method can advantageously generate a backscatter curve for each individual reception element. In other words, a reception element can be allocated to each time-of-flight measurement. The correlation for each reception element can be determined and optionally averaged based on the backscatter curve and sensitivity curve.

In addition, only a portion of the reception elements of the reception unit or only one reception element can be used for particle cloud recognition. In other words, the number of reception elements used for particle cloud detection is smaller than the overall number of reception elements.

This reception element is then used to determine the backscatter curve and sensitivity curve.

Tthe evaluation comprises determining a correlation between the sensitivity curve and backscatter curve. It is here advantageous that the sensitivity curve has very similar characteristics to a section of a backscatter curve that can be attributed to a reflection on a particle cloud.

In particular, described in simplified terms, this stems from the fact that a particle cloud extends over a specific distance range to a device for implementing the method, so that several measuring pulses are reflected on closer particles of the particle cloud, while other measuring pulses are reflected on more remote particles of the particle cloud. As a whole, reflections are typically received from all distances encompassed by the particle cloud to a device for implementing the method. Precisely this type of reflections is represented by the sensitivity curve, which images how a reception unit, preferably a device for implementing the method, responds to reflections from all varying distances to a reception unit, in particular to a device for implementing the method.

Therefore, the progression of the sensitivity curve is very similar to the section of a backscatter curve that is to be attributed to the reflection on a particle cloud. In particular, the shape of the curves is similar. In particular, the determination of a correlation between the sensitivity curve and backscatter curve makes it possible to determine whether at least one section of the backscatter curve has a similar progression, in particular shape, to the sensitivity curve, so that this section is to be attributed to the reflection on a particle cloud.

The term "correlation" is to be understood as a relation between the backscatter curve and sensitivity curve. The correlation is a degree for how similar at least one section, in particular its shape, of the backscatter curve is to the sensitivity curve. This section of the backscatter curve could correspond to the reflection on a particle cloud.

The backscatter curve above comprises at least one elevation, preferably several elevations. In particular, an elevation is present if it distinctly stands out from the noise of the backscatter curve, meaning in other words from a corresponding deviation in values for the optical power with an identical time-of-flight. An elevation is present if the elevation has a maximum optical power that preferably corresponds to at least twice of the noise.

In particular, the correlation is determined to ascertain whether at least one section of the backscatter curve exhibits a similarity to the sensitivity curve. In particular, the term "section" is to be understood as a part of the backscatter curve that comprises an elevation in the backscatter curve. In particular, it can be ascertained based on the determined correlation whether a particle cloud was measured during the time-of-flight measurement, in other words whether measuring pulses of the time-of-flight measurement were reflected on a particle cloud.

The method can further comprise recognizing a particle cloud and preferably determining a level of confidence for recognizing the particle cloud. In particular, the confidence level is determined based on the determined correlation. The confidence level is a degree of the quality, in other words of the plausibility, of the particle cloud recognition.

The method preferably comprises outputting a message with respect to the at least one particle cloud feature. For example, an output could read as follows: "Particle cloud status "Yes" with a particle cloud probability of 75%".

In particular, the method comprises executing a plurality of time-of-flight measurements, wherein the particle cloud status of the time-of-flight measurement is a "Yes" or "No" respectively. The method comprises setting a first threshold, wherein a particle cloud is recognized if the number of time-of-flight measurements with a particle cloud status of "Yes" exceeds the first threshold. The first threshold can be defined as "1", for example so that a particle cloud is already recognized given a time-of-flight measurement with a particle cloud status of "Yes". In addition, the first threshold can be defined in such a way that it measures 10%, most preferably 20%, of all time-of-flight measurements.

In addition, the method can comprise setting a second threshold for the particle cloud probability, wherein a particle cloud is recognized when the number of time-of-flight measurements exceeds the first threshold with a particle cloud probability above the second threshold.

In particular, the confidence level is represented as a probability. The method thus determines a confidence level of between 0 and 100%, wherein 100% means that the correlation is very high, and the method is thus very certain that measuring pulses were reflected on a particle cloud, while 0% means that the correlation is negligibly slight, so that it must be assumed that no measuring pulse was reflected on the particle cloud.

Preferably, the method comprises outputting a message with respect to the recognition of a particle cloud and the determined confidence level. For example, an output could read as follows: "A particle cloud was recognized here with a confidence level of 75%".

In particular, the correlation is determined by folding the backscatter curve with the sensitivity curve. In addition, the determination of the correlation can comprise a Fourier transformation, in particular a fast Fourier transformation. The determination of the correlation can further comprise the use of an optimal filter adjusted to the sensitivity curve. It can be trained beforehand, wherein the method comprises training of the optimal filter by means of a neuronal network. In particular, the optimal filter can be trained with the help of an auto encoder. In addition, the optimal filter can be trained through deep learning.

In order to provide the sensitivity curve, the method can comprise simulating the sensitivity curve.

In addition, the sensitivity curve can be measured. For example, at least one object can be placed at varying distances to a reception unit, specifically without a particle cloud being present, wherein the reception unit receives the respectively reflected optical power, and converts it into a corresponding electronic signal. The reception unit or rather the device for conducting the process comprises a biaxial optic. As a whole, then, this yields the progression of the electronic signal as a measure of the reflected optical power as a function of the distance or time-of-flight, and hence the sensitivity curve. By comparison to a simulation, the advantage of a measurement, in particular its end-of-line, is that it also includes the electrical behavior of the reception unit, in particular that of the device for implementing a method, in other words that of the sensor, as well as the mechanical and optical deviations individual to the sensors. In addition, a simulation is associated with much more effort, and could be incomplete.

The sensitivity curve can be measured specifically for the design of a device, in other words of a sensor, for implementing the method. The term "sensor design" refers to the design of the sensor, influenced by the model and the corresponding technology, or influenced by the detector type and/or the optics and/or the measuring principle.

In particular, the method comprises considering a possible scaling of the backscatter curve as a function of a density of a particle cloud while determining the correlation. In particular, the reflection on a particle cloud depends on its thickness. The denser the particle cloud, the higher the signal, i.e., indirectly the optical power, in the backscatter curve. In other words, the backscatter curve can be scaled with a factor that takes the particle cloud density into account. The denser the particle cloud, the more the backscatter curve is compressed in the direction of the x-axis. This scaling can change the progression of the backscatter curve in relation to the sensitivity curve. Even though the height of the elevation in the backscatter curve, which is to be attributed to a reflection on a particle cloud, depends on its thickness, the basic shape is still similar to that of the sensitivity curve to an extent that, even with a varyingly dense particle cloud, a correlation indicating the reflection is the reflection on a particle cloud can be determined.

In another aspect, the method can comprise recognizing a density of the particle cloud, and preferably determining a level of confidence for recognizing the density. In particular, the method can comprise taking the height of a peak into account. The evaluation preferably comprises estimating the maximum height of the elevation in the backscatter curve that was allocated to the reflection on a particle cloud, from which the density of the particle cloud can be inferred. The confidence level is a measure of the quality, in other words of the plausibility, of the recognized density.

In particular, the confidence level for recognizing the density is represented as a probability. The method thus determines a confidence level of between 0 and 100%, wherein 100% means that the evaluation very clearly makes it possible to infer the recognized density, and that the method is thus very certain that the particle cloud has precisely this density, while 0% means that the evaluation was not clear, so that it is very uncertain whether the particle cloud actually has the recognized density.

The method preferably comprises outputting a message with respect to the recognition of the density and the determined confidence level. For example, an output could read as follows: "The density of the particle cloud measures X particles per volume with a confidence level of 80%".

A message can be directed to a driver of a vehicle, wherein the vehicle is navigated by means of the present method and/or the driver is assisted with the help of the present method. The output serves in particular to inform the driver that the vehicle is located in a particle cloud and/or is moving toward a particle cloud.

Further, the method can comprise executing at least one additional measurement to measure the measuring data of at least one additional sensor modality. In other words, the sensor modality involves a sensor category. Sensors thus differ in particular by the sensor modality or sensor category. In particular, the sensor modality determines the measurement method with which the measuring data are generated. The sensor modality preferably comprises Lidar, radar, image or ultrasound. With respect to the corresponding sensor modality, this preferably means that a Lidar sensor, a radar sensor, an image sensor, in particular a camera, or an ultrasound sensor are involved. The method preferably comprises measuring radar measuring data, image data and/or ultrasound data.

The method can preferably comprise determining a confidence level for detecting a particle cloud for the measuring data of each sensor modality, wherein the method further comprises balancing the determined confidence levels. In particular, an overall confidence level is determined, in which the confidence levels of the individual sensor modalities are considered. This overall confidence level can be output together with a message.

In particular, the corresponding time-of-flight measurement can be allocated to each point in a point cloud. In an additional step, the method can comprise determining a confidence level for the time-of-flight measurement, in particular for the corresponding points in a point cloud, by taking the recognition of a particle cloud into account.

Further, the confidence level can be understood as the quality of a time-of-flight measurement, i.e., as the quality or as the probability that its results are degraded, in particular by the reflection on a particle cloud. The greater the confidence level, the less likely that it is degraded. As a whole, the present method thus makes it possible to estimate the quality of the time-of-flight measurement.

As soon as a particle cloud has been recognized, the confidence level for the time-of-flight measurement degraded due to the particle cloud is adjusted. In particular, the confidence level is adjusted in comparison to a time-of-flight measurement during which no particle cloud was recognized. In particular, the confidence level is determined as a function of the recognition of a particle cloud and/or a function of the recognition of its density and/or a function of the confidence level for the recognition of the particle cloud and/or a function of the confidence level for the recognition of the density.

In addition, the method can comprise generating a 3D depth map, which describes distances at which and/or directions in which a particle cloud and/or the recognized objects are located from a device for implementing the method.

If the method comprises a plurality of time-of-flight measurements, the respective steps described above are preferably conducted for each of the measurements.

The confidence level for the time-of-flight measurement can be allocated to the corresponding points in a point cloud. The method can comprise generating a point cloud, which comprises points from various time-of-flight measurements. The allocation of confidence levels allows the point cloud to contain points with various confidence levels.

In particular, the method comprises an object recognition, wherein the method comprises distinguishing between objects and particle clouds. In particular, elevations in the backscatter curve are observed and classified within the framework of object recognition. In order to assess whether an object should be allocated to an elevation in the backscatter curve, information about the similarity, meaning the correlation between the backscatter curve and sensitivity curve, can be relevant. If enough correlation exists between an elevation and the sensitivity curve, it must be assumed that the elevation does not result from a reflection on an object, but rather from reflections on a particle cloud. The method comprises a classification of elevations as a particle cloud or object, while the method further preferably comprises determining a confidence level for each classification. In particular, the confidence level is ascertained based on the determined correlation. The confidence level is a measure of the quality, in other words of the plausibility, of the classification.

In particular, the confidence level is represented as a probability. The method thus determines a confidence level of between 0 and 100%, wherein 100% means that the correlation very clearly indicates that the respectively classified reflection object is here involved, while 0% means that the correlation is not clear, so that it is uncertain whether the elevation is to be attributed to the reflection on a particle cloud or an object.

Advantageously, the method advantageously comprises outputting a message with respect to the classification and the determined confidence level. For example, an output could read as follows: "An object was here recognized at distance x with a confidence level of 60%".

In another aspect, the present invention may comprise a device for distance measurement, wherein the device consists of a reception unit and a transmission unit for executing at least one time-of-flight measurement. The transmission unit is used to transmit at least one measuring pulse, in particular a plurality of measuring pulses, while the reception unit is used to receive at least one reflected measuring pulse, in particular reflected measuring pulses, which were transmitted beforehand and reflected on a particle cloud or on at least one object. The device is designed for implementing a method described above.

Further, the invention may further comprise an evaluation unit, which is designed to evaluate the backscatter curve for object recognition, in particular of at least one object and/or one particle cloud, on which the measuring pulses were reflected. The evaluation unit is further designed to determine a correlation between the sensitivity curve and backscatter curve. The evaluation unit can further be designed to recognize an object and/or recognize a particle cloud and/or recognize objects and/or classify the density of a recognized particle cloud and/or output a response and/or determine a confidence level and/or distinguish between particle clouds and objects. The evaluation unit can consist of digital signal processors, e.g., ASICs and/or FPGAs and/or microprocessors, etc.

The device in particular comprises a LIDAR device, in particular a scanning LIDAR device or a flash LIDAR device. In particular, the device comprises a LIDAR sensor. The device can further comprise a radar sensor, an image sensor, in particular a camera, or an ultrasound sensor. In addition, the device can be a driver assistance system.

In another aspect, the invention may comprise a computer program product consisting of a computer-readable storage medium, on which a program is stored, once it has been loaded into the memory of the computer, enabling a computer to implement a method described above, if necessary in conjunction with a device described above.

In addition, the invention may relate to a computer-readable storage medium, on which a program is stored, once it has been loaded into the memory of the computer, enabling a computer to implement a method described above, if necessary in conjunction with a device described above.

BRIEF DESCRIPTION OF THE DRAWINGS

It is shown in a schematic way in.

DETAILED DESCRIPTION OF PREFERRED EMBODIMENTS

Figure 1:
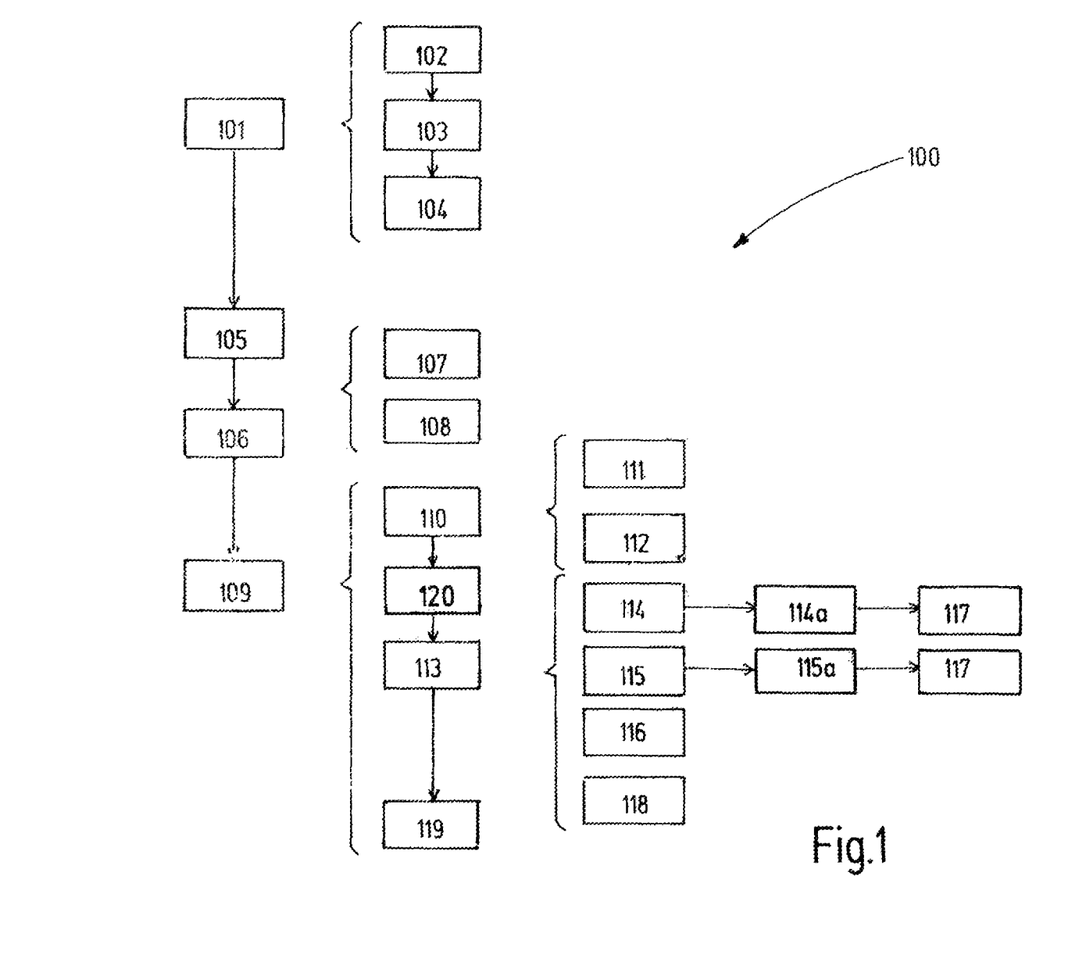
FIG. 1 a process diagram for a method according to the invention.

FIG. 1 shows a process diagram of a method (100) according to the invention for distance measurement. The method comprises executing (101) at least one time-of-flight measurement, wherein a time-of-flight measurement comprises transmitting (102) at least one measuring pulse by means of a transmission unit (12), reflecting (103) at least one transmitted measuring pulse and receiving (104) at least one reflected measuring pulse by means of a reception unit (11). The method can further comprise executing several time-of-flight measurements.

The method further comprises generating (105) a backscatter curve (20) based on the time-of-flight measurement, as well as providing (106) a sensitivity curve (21). The sensitivity curve (21) can be simulated (107) and/or measured (108).

The method (100) further comprises evaluating (109) the backscatter curve (20) for object recognition (113). The evaluation (109) comprises determining (110) a correlation between the sensitivity curve (21) and backscatter curve (20). The correlation can be determined by means of a fold (111) and/or by using (112) an optimal filter. The purpose of determining (110) the correlation is to use the at least one time-of-flight measurement to determine whether a particle cloud (27) is arranged in a measuring range that was measured by means of the time-of-flight measurement and to allocate (120) a particle cloud feature to the time-of-flight measurement. In particular, the method comprises such an allocation (120).

The evaluation (109) can further comprise an object recognition (113). The method (100) can comprise recognizing (114) a particle cloud (27). For this purpose, the method can comprise above all setting a first threshold, wherein a particle cloud is recognized (114) if the number of time-of-flight measurements message with respect with a particle cloud status of "Yes". Alternatively or additionally, the method can comprise setting a second threshold for the particle cloud probability, wherein a particle cloud is recognized (114) if the number of time-of-flight measurements exceeds the first threshold with a particle cloud probability above the second threshold.

After a particle cloud has been recognized (114), the method (100) can determine a confidence level for the recognition (114a). In addition, the method (100) can comprise recognizing (115) a density of the particle cloud, as well as determining (115a) a confidence level for density recognition. The method (100) can comprise the recognition (116) of objects, wherein a distinction can be made (118) between particle clouds (27) and objects (26). In addition, the method can comprise outputting (117) a message with respect to the recognition of a particle cloud and/or its density. The evaluation (109) of the backscatter curve (20) can further comprise generating (119) a 3D-depth map, which indicates the distances at which a recognized particle cloud and/or recognized objects (26) are located from a device (10) for implementing the method (100).

Figure 2:
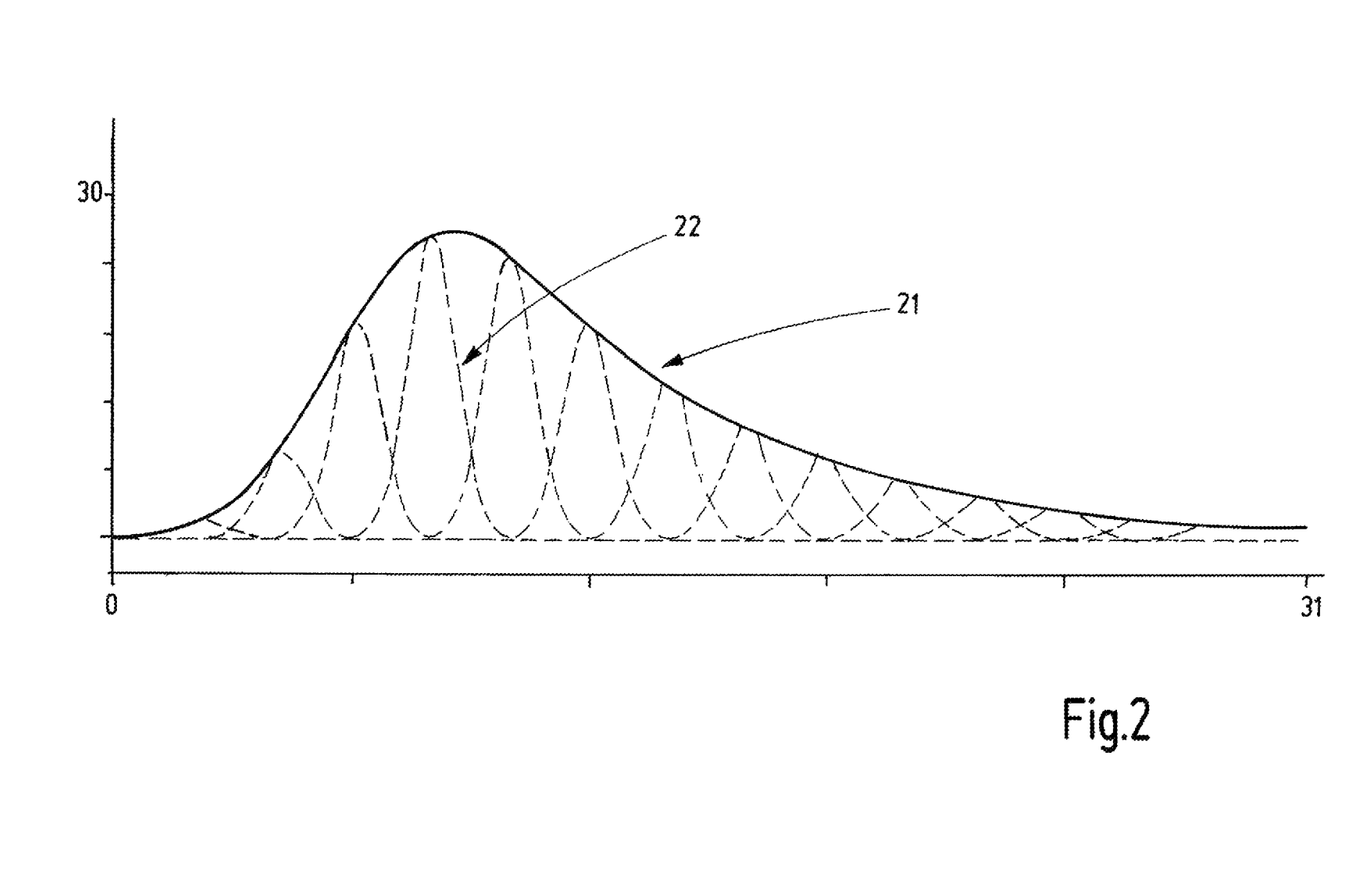
FIG. 2 a sensitivity curve.

FIG. 2 shows a sensitivity curve (21). The sensitivity curve is a representation of an electronic signal (30), which was converted from the received optical power, and thus serves as an indirect measure of the optical power, over the time-of-flight (31). On the one hand, FIG. 2 here shows how a sensitivity curve (21) was measured via an individual measurement (22). The individual measurements (22) are based on measurements in which an object is placed at varying distances, and hence with varying times-of-flight (31), relative to a reception unit (11). For each distance or each time-of-flight (31), the optical power is measured after reflection on the object, and converted into an electronic signal (30) that is recorded against the time-of-flight. It is thus derived by interpolating the sensitivity curve (21). In addition, the sensitivity curve (21) can be simulated. The same progression then results as well.

Figure 3:
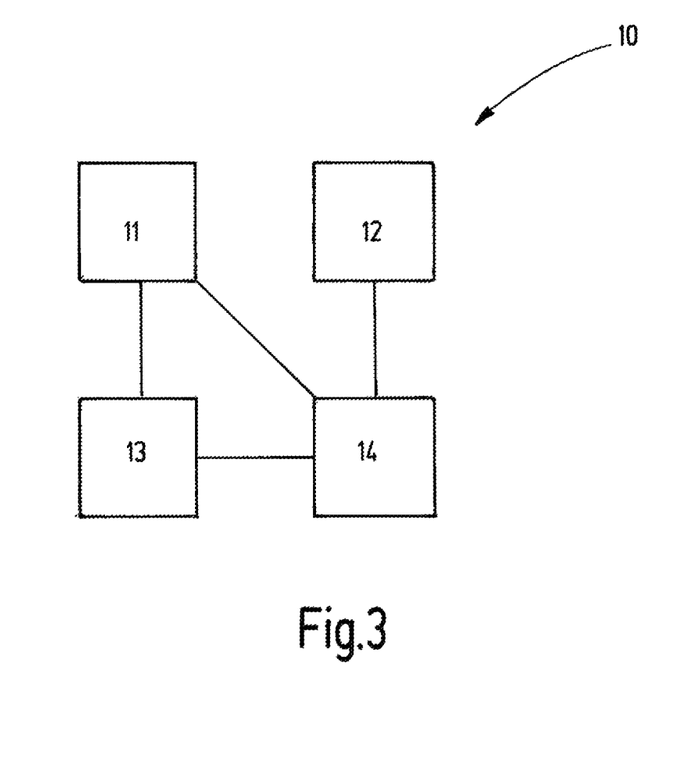
FIG. 3 a device according to the invention for implementing a method according to the invention.

FIG. 3 shows a device (10) according to the invention for implementing a method (100) according to the invention. The device (10) according to the invention may comprise a reception unit (11) and a transmission unit (12). The transmission unit (12) is used to transmit measuring pulses, while the reception unit (11) is used to receive the reflected measuring pulses. As a whole, the reception unit (11) and transmission unit (12) are used for executing time-of-flight measurements. The evaluation unit (13) is used to evaluate the backscatter curve as a result of the time-of-flight measurement, specifically with the help of the sensitivity curve (21). The device (10) further has a control unit (14), which is set up to correspondingly actuate the reception unit (11), the transmission unit (12) and/or the evaluation unit (13).

Figure 4:
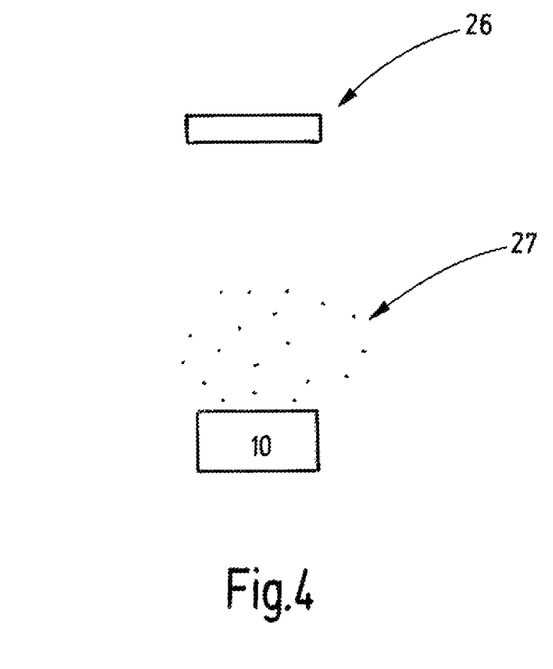
FIG. 4 a device according to the invention with a particle cloud and an object.

FIG. 4 shows a device (10) in front of which a particle cloud (27) is located in direct proximity, as well as an object (26) located a distance away from the device (10) and particle cloud (27).

Figure 5:
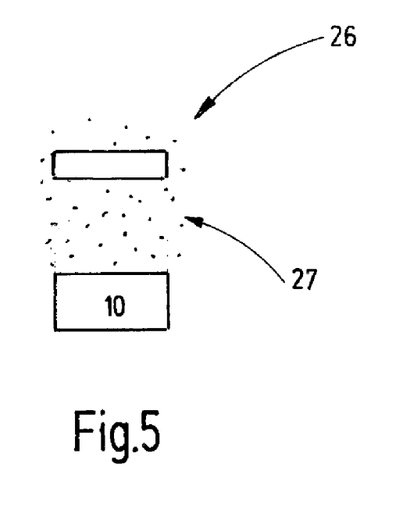
FIG. 5 a device according to the invention with a particle cloud and an object.

FIG. 5 shows a device (10) in front of which a particle cloud (27) is located in direct proximity. An object (26) is located in the particle cloud. The backscatter curve (20) correspondingly obtained after executing a time-of-flight measurement based on FIG. 4 is visible on FIG. 6. The backscatter curve (20) is an indirect representation of optical power over time-of-flight (31), in which an electronic signal (30) converted from the received optical power is recorded against the time-of-flight. Several elevations (23) are visible in the backscatter curve (20). An object is typically allocated to such elevations (23).

Figure 6:
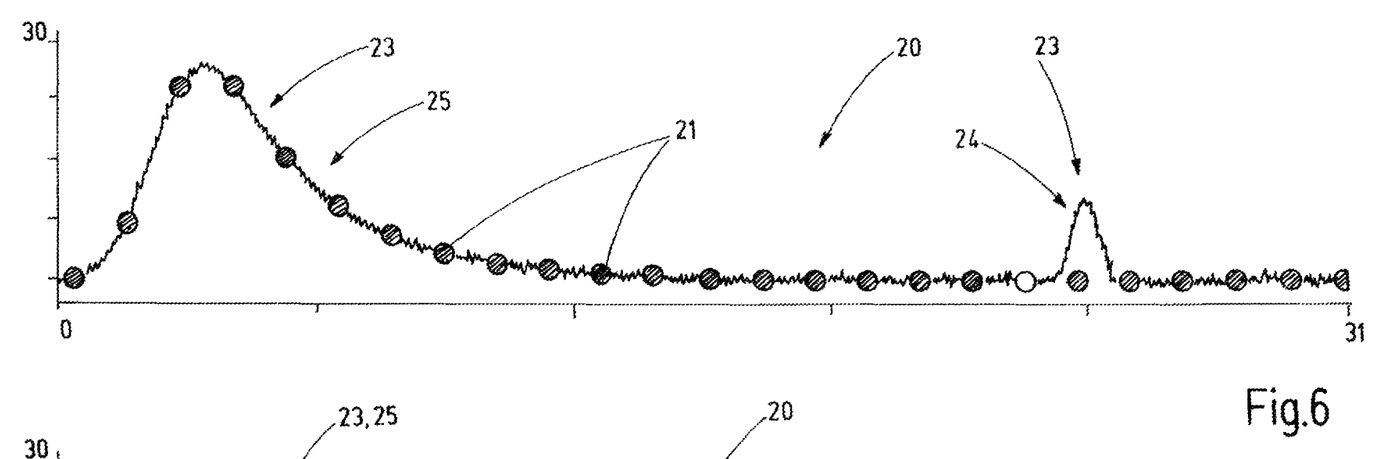
FIG. 6 a backscatter curve together with a sensitivity curve.

FIG. 6 further shows the sensitivity curve (21) with a dotted line. Within the framework of determining a correlation, it is ascertained that at least the section of the backscatter curve (20) comprising the left elevation (23) strongly correlates with the sensitivity curve (21). This is also clearly visible on FIG. 6, with the similarity between the shape of the backscatter curve (20) and the sensitivity curve (21) being clearly evident. Based on the high correlation, the left elevation (23) is classified as being the result of a reflection on a particle cloud (27). As a consequence, an elevation (25) of the backscatter curve (20) is resulted from a reflection on a particle cloud (27).

With respect to the right elevation (23), no correlation—at least no sufficient correlation-can be determined, so that the elevation can be recognized with sufficient probability as an elevation (24) due to a reflection on an object. In this way, particle clouds (27) can be clearly distinguished from objects (26).

Figure 7:
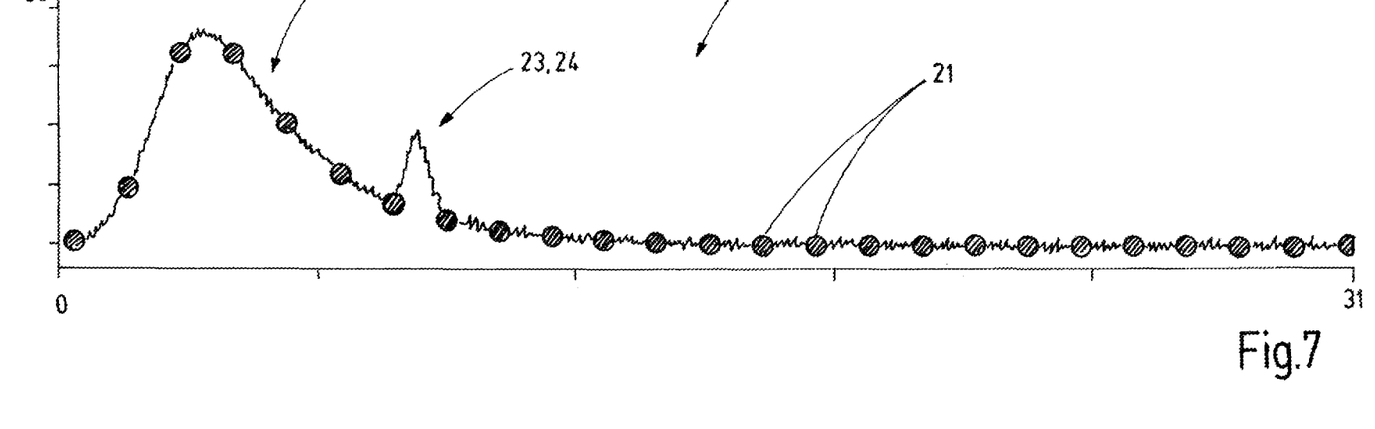
FIG. 7 another backscatter curve together with a sensitivity curve.

FIG. 7 shows the backscatter curve (20) obtained after executing a time-of-flight measurement based on FIG. 5. Because the object (26) is located within the particle cloud (27), the elevation (23) to be attributed to the object is arranged on the elevation resulted from the particle cloud. The signals have been added up at this location, so that if an object (26) is located within a particle cloud (27), it can be clearly recognized and distinguished from the particle cloud (27).

What is claimed:

1. A device for optical distance measurement, the device comprising:
    a transmission unit adapted to transmit measuring pulses;
    a reception unit, the reception unit including at least one reception element adapted to receive reflections of the measuring pulses to determine a time-of-flight measurement from the received reflections, and wherein a sensitivity curve describes a sensitivity of at least one of the at least one reception element as a function of distance to an object; and
    an evaluation unit adapted to
        generate a backscatter curve, wherein the backscatter curve describes signals generated responsive to the received reflections of at least one measuring pulse;
        determine a correlation between the sensitivity curve and the backscatter curve; and
        determine whether at least one section in the backscatter curve indicates a particle cloud arranged in a measuring range that was measured by the time-of-flight measurement or indicates an object in the measuring range that was measured by the time-of-flight measurement based on the determined correlation.

2. The device of claim 1 wherein the evaluation unit is adapted to determine the correlation between the sensitivity curve and the backscatter curve by considering a possible scaling of the backscatter curve as a function of a density of a particle cloud.

3. The device of claim 1 wherein the evaluation unit is adapted to determine whether the at least one section in the backscatter curve indicates a particle cloud arranged in the measuring range that was measured by the time-of-flight measurement or indicates an object in the measuring range that was measured by the time-of flight measurement based on the determined correlation by determining a confidence level of the particle cloud being arranged in the measuring range.

4. The device of claim 1 wherein the evaluation unit is adapted to determine whether the at least one section in the backscatter curve indicates a particle cloud arranged in the measuring range that was measured by the time-of-flight measurement or indicates an object in the measuring range that was measured by the time-of flight measurement based on the determined correlation by determining a probability of the particle cloud being arranged in the measuring range and determining if the probability is beyond a threshold.

5. The device of claim 1 wherein the evaluation unit is adapted to determine whether the at least one section in the backscatter curve indicates a particle cloud arranged in the measuring range that was measured by the time-of-flight measurement or indicates an object in the measuring range that was measured by the time-of flight measurement based on the determined correlation by determining a number of time-of-flight measurements that each have a determined probability of a particle cloud being arranged in the measuring range that is beyond a threshold.

6. The device of claim 1 wherein the evaluation unit is adapted to determine a correlation between the sensitivity curve and the backscatter curve by determining a measure of density of a particle cloud being arranged in the measuring range and scaling the backscatter curve to account for the determined measure of density.

7. The device of claim 6 wherein the evaluation unit is further adapted to determine a confidence level for the determined measure of density of a particle cloud.

8. The device of claim 1 wherein the evaluation unit is further adapted to determine a confidence level as to whether the at least one section in the backscatter curve indicates a particle cloud.

9. The device of claim 1 wherein the evaluation unit is further adapted to output a message responsive to determining that the at least one section in the backscatter curve indicates an object in the measuring range that was measured by the time-of-flight measurement.

10. A method, the method comprising:
transmitting measuring pulses;
receiving reflections of the measuring pulses with at least one reception unit;
determining a time-of-flight measurement from the received reflections;
generating a backscatter curve, wherein the backscatter curve describes signals generated responsive to the received reflections of at least one measuring pulse;
determining a correlation between a sensitivity curve and the backscatter curve, where the sensitivity curve describes a sensitivity of at least one of the at least one reception element as a function of distance to an object; and
determining whether at least one section in the backscatter curve indicates a particle cloud arranged in a measuring range that was measured by the time-of-flight measurement or indicates an object in the measuring range that was measured by the time-of-flight measurement based on the determined correlation.

11. The method of claim 10 wherein the determining the correlation between the sensitivity curve and the backscatter curve comprises considering a possible scaling of the backscatter curve as a function of a density of a particle cloud.

12. The method of claim 10 wherein the determining whether at least one section in the backscatter curve indicates a particle cloud arranged in the measuring range that was measured by the time-of-flight measurement or indicates an object in the measuring range that was measured by the time-of-flight measurement based on the determined correlation comprises determining a confidence level of the particle cloud being arranged in the measuring range.

13. The method of claim 10 wherein the determining whether at least one section in the backscatter curve indicates a particle cloud arranged in the measuring range that was measured by the time-of-flight measurement or indicates an object in the measuring range that was measured by the time-of-flight measurement based on the determined correlation comprises determining a probability of the particle cloud being arranged in the measuring range and determining if the probability is beyond a threshold.

14. The method of claim 10 wherein the determining whether at least one section in the backscatter curve indicates a particle cloud arranged in the measuring range that was measured by the time-of-flight measurement or indicates an object in the measuring range that was measured by the time-of-flight measurement based on the determined correlation comprises determining a number of time-of-flight measurements that each have a determined probability of a particle cloud being arranged in the measuring range is beyond a threshold.

15. The method of claim 10 wherein the determining the correlation between the sensitivity curve and the backscatter curve comprises determining a measure of density of a particle cloud being arranged in the measuring range and scaling the backscatter curve to account for the determined measure of density.

16. The method of claim 15 further comprising determining a confidence level for the determined measure of density of a particle cloud.

17. The method of claim 10 further comprising determining a confidence level as to whether the at least one section in the backscatter curve indicates a particle cloud.

18. The method of claim 10 further comprising outputting a message responsive to determining that the at least one section in the backscatter curve indicates an object in the measuring range that was measured by the time-of-flight measurement.

19. A computer program product, which comprises a computer-readable medium, on which a program is stored, once it has been loaded into the memory of the computer, enabling a computer to implement a method for optical distance measurement, where the method comprises:
transmitting measuring pulses;
receiving reflections of the measuring pulses with at least one reception unit;
determining a time-of-flight measurement from the received reflections;
generating a backscatter curve, wherein the backscatter curve describes signals generated responsive to the received reflections of at least one measuring pulse;
determining a correlation between a sensitivity curve and the backscatter curve, where the sensitivity curve describes a sensitivity of at least one of the at least one reception element as a function of distance to an object; and
determining whether at least one section in the backscatter curve indicates a particle cloud arranged in a measuring range that was measured by the time-of-flight measurement or indicates an object in the measuring range that was measured by the time-of-flight measurement based on the determined correlation.

* * * * *